(12) United States Patent
Wilson

(10) Patent No.: US 11,788,395 B2
(45) Date of Patent: Oct. 17, 2023

(54) OILFIELD PRESSURE PUMPING SYSTEM WITH SLOW SPEED AND HIGH PRESSURE FRACTURING FLUID OUTPUT

(71) Applicant: Twin Disc, Inc., Racine, WI (US)

(72) Inventor: Edwin E. Wilson, Colleyville, TX (US)

(73) Assignee: Twin Disc, Inc., Racine, WI (US)

( * ) Notice: Subject to any disclaimer, the term of this patent is extended or adjusted under 35 U.S.C. 154(b) by 178 days.

(21) Appl. No.: 17/354,283

(22) Filed: Jun. 22, 2021

(65) Prior Publication Data

US 2021/0396121 A1 Dec. 23, 2021

Related U.S. Application Data

(60) Provisional application No. 63/042,231, filed on Jun. 22, 2020.

(51) Int. Cl.
| | | |
|---|---|---|
| *E21B 43/26* | (2006.01) | |
| *F04B 9/02* | (2006.01) | |
| *F04B 9/10* | (2006.01) | |
| *F04B 17/05* | (2006.01) | |
| *F04B 49/20* | (2006.01) | |
| *F04B 49/02* | (2006.01) | |
| *F04B 23/04* | (2006.01) | |
| *F04B 15/02* | (2006.01) | |

(52) U.S. Cl.
CPC ............ *E21B 43/2607* (2020.05); *F04B 9/02* (2013.01); *F04B 9/10* (2013.01); *F04B 17/05* (2013.01); *F04B 23/04* (2013.01); *F04B 49/02* (2013.01); *F04B 49/20* (2013.01); *F04B 15/02* (2013.01); *F04B 2203/0605* (2013.01)

(58) Field of Classification Search
CPC .......... E21B 43/2607; F04B 9/02; F04B 9/10; F04B 17/05; F04B 23/04; F04B 49/02; F04B 49/20; F04B 15/02; F04B 2203/0605
See application file for complete search history.

(56) References Cited

U.S. PATENT DOCUMENTS

| 3,714,846 A * | 2/1973 | Louis .................. F16H 47/04 475/82 |
| 4,019,404 A | 4/1977 | Schauer |
| 6,663,525 B1 * | 12/2003 | McKee .................. F16H 61/20 475/83 |
| 7,563,076 B2 | 7/2009 | Brunet et al. |
| | (Continued) | |

FOREIGN PATENT DOCUMENTS

WO 2017123495 A2 7/2017

*Primary Examiner* — Charles G Freay
(74) *Attorney, Agent, or Firm* — Boyle Fredrickson S.C.

(57) ABSTRACT

An oilfield pressure pumping system is configured to perform a preliminary fracturing stage or operation at a high pressure but slow speed before initiating normal fracturing. The oilfield pressure pumping system includes an auxiliary underdrive system that can drive the transmission at a slower input speed that can be provided by an idle speed of the power unit's engine to facilitate different fracturing modes, including a preliminary fracturing mode during a slow speed high pressure preliminary fracturing stage. The auxiliary underdrive system may include a hydrostatic transmission driven by the engine and which drives the transmission at an underdrive speed that would correspond to a sub-idle engine speed driving the transmission.

15 Claims, 7 Drawing Sheets

(56) References Cited

U.S. PATENT DOCUMENTS

| | | |
|---|---|---|
| 7,901,314 B2 | 3/2011 | Salvaire et al. |
| 9,059,587 B2 | 6/2015 | Williams |
| 93,595,049 | 7/2016 | Vicknair et al. |
| 9,638,194 B2 | 5/2017 | Wiegman et al. |
| 10,221,856 B2 | 3/2019 | Hernandez et al. |
| 10,358,035 B2 | 7/2019 | Cryer et al. |
| 2008/0182699 A1* | 7/2008 | Salvaire ............... F04B 17/05 166/305.1 |
| 2015/0369351 A1 | 12/2015 | Hermann et al. |
| 2019/0178235 A1 | 6/2019 | Coskrey et al. |
| 2019/0249652 A1 | 8/2019 | Stephenson et al. |

\* cited by examiner

OILFIELD PRESSURE PUMPING SYSTEM WITH SLOW SPEED AND HIGH PRESSURE FRACTURING FLUID OUTPUT

CROSS REFERENCE TO RELATED APPLICATIONS

This application claims the benefit of priority under 35 USC § 119(e) to U.S. Provisional Patent Application No. 63/042,231, filed Jun. 22, 2020, the entire contents of which are hereby expressly incorporated by reference into the present application.

BACKGROUND OF THE INVENTION

Field of the Invention

The preferred embodiments relate generally to the field of hydrocarbon recovery from the earth and, more specifically, to oilfield pressure pumping systems for fracturing underground formations to enhance recovery of hydrocarbons.

Discussion of the Related Art

Hydraulically fracturing (fracking) subterranean formations with oilfield pressure pumping systems to enhance flow in oil and gas wells is known. Hydraulic fracturing increases well productivity by increasing the porosity of, and thus flow rate through, production zones that feed boreholes of the wells that remove underground resources like oil and gas.

Fracking subterranean shale formations is typically initiated with a high-flow and high-pressure introduction of fracking (or frac) fluid. Fracking equipment has been operated to provide as much flow as possible at high pressures, which may exceed 15,000 psi (pounds per square inch), to start and maintain the fracking operation.

Efforts are being made to better understand rock mechanics or other geological characteristics to improve fracturing effectiveness with different fracking methodologies, with hopes of enhancing well productivity. One approach being considered is to slow down initial fracturing in order to let more fissures develop and let those fissures propagate further before introducing a high flow or high speed and high pressure delivery of frac fluid.

However, implementing a slow speed/high pressure preliminary fracturing stage presents numerous challenges. Known fracking equipment such as frac pumps or pressure pumpers that are driven by power units with diesel engines and transmissions are typically incapable of delivering frac fluid at both a slow speed/low flow rate and a high pressure.

Pressure pumpers have output flow characteristics that are restricted by the mechanical capabilities of their components, which are typically incompatible with providing slow speed/low flow output at high pressures. A pressure pumper typically includes a positive displacement pump with positive displacement cylinders, with its output flow rate determined by its driven speed. A lower limit to the pump's driven speed and a corresponding lower limit to the pump's output flow rate or frac fluid flow speed is determined by operating characteristics of the upstream power unit, specifically, to the power unit's engine and transmission. An engine cannot be operated slower than its idle speed and a transmission cannot be operated at a slower speed than provided by its lowest range. Accordingly, a lowest possible output flow rate of a pressure pumper's pump is achieved when its power unit's engine is operating at idle speed and its transmission is in its lowest range. A typical idle speed of a diesel engine in a pressure pumper power unit is about 800 rpm (rotations per minute). A typical low range in a pressure pumper power unit has a gear ratio of about 4.45:1. This drives the pressure pumper's pump at about 180 rpm, which delivers frac fluid at about 3.3 bpm (barrels per minute) or about 138.6 gpm (gallons per minute). However, this flow rate is multiples more than flow rate targets for at least some slow speed/high pressure preliminary fracturing stage implementations of, for example, about 0.5 bpm or about 21 gpm.

What is therefore needed is a pressure pumper that can deliver frac fluid at a slow speed/high pressure when in a preliminary fracking mode during an initial fracturing stage and at a high speed/high pressure when in a normal fracking mode during a main fracking stage.

SUMMARY AND OBJECTS OF THE INVENTION

The preferred embodiments overcome the above-noted drawbacks by providing a pressure pumper power unit with an auxiliary underdrive system that can drive the transmission at a slower input speed than can be provided by an idle speed of the power unit's engine and a low range of the power unit's transmission to facilitate different fracturing modes.

An oilfield pressure pumping system is configured to perform a preliminary fracturing stage or operation at high pressure but slow speed before initiating normal fracturing. The oilfield pressure pumping system includes a pressure pumper configured to deliver fracturing fluid into a subterranean formation to fracture the subterranean formation. The pressure pumper includes a fracturing pump that delivers the fracturing fluid at different output flow rates that correspond to different driven speeds of the fracturing pump. A power unit drives the fracturing pump at the different speeds. The power unit includes a prime mover such as an internal combustion engine and a transmission that receives power from the engine and selectively delivers power to drive the fracturing pump. A torque converter may be arranged between the engine and transmission. An auxiliary underdrive system may selectively deliver power to the transmission for driving the fracturing pump at a slower speed than can be achieved by transmitting power from the engine through the transmission or through the torque converter and transmission in series. The auxiliary underdrive system may provide a hydrostatic transmission that delivers power to the transmission through a different power flow path than during default use when the system is in a normal fracturing mode.

In another aspect of this embodiment, the prime mover is an internal combustion engine. The pressure pumper defines a normal fracking mode with the internal combustion engine delivering power to the transmission for driving the fracturing pump, a preliminary fracking mode with the auxiliary underdrive system delivering power to the transmission for driving the fracturing pump.

According to another aspect of this preferred embodiment, the transmission includes a transmission input shaft, and the internal combustion engine defines an engine idle speed. The auxiliary underdrive system rotates the transmission input shaft at a slower rotational speed than the engine idle speed.

In a still further aspect of this preferred embodiment, the power unit of the pressure pumper further defines a torque converter arranged between the internal combustion engine and the transmission for delivering power from the internal combustion engine to the transmission.

According to further aspect of this preferred embodiment, the auxiliary underdrive system receives power from the torque converter and delivers power to the transmission. The auxiliary underdrive system including a hydraulic pump that receives power from the torque converter; and a hydraulic motor driven by the hydraulic pump and delivering power to the transmission when the pressure pumper is in the preliminary fracking mode.

According to yet another aspect of this preferred embodiment, the hydraulic pump is mounted to a pump pad of the torque converter; and the hydraulic motor is mounted to a pump pad of the transmission.

In a further aspect of this preferred embodiment, the internal combustion engine operates at variable speeds and includes an idle speed as a slowest engine speed. The transmission has multiple ranges that correspond to multiple gear ratios for driving the fracturing pump at different rotational speeds at a constant speed of the internal combustion engine, with the multiple ranges including a low range as a lowest gear ratio. The pressure pumper power unit defines a slowest engine-driven speed defined when the internal combustion engine is operating at the idle speed, and the transmission is in the low range, and the auxiliary underdrive system selectively drives the fracturing pump at an underdrive speed that is slower than the slowest engine-driven speed.

According to another embodiment of the invention, an oilfield pressure pumping system for delivering a fracturing fluid into a subterranean formation at a slow speed and high pressure using a prime mover includes a pressure pumper configured to deliver the fracturing fluid into the subterranean formation to fracture the subterranean formation. The pressure pumper itself includes a fracturing pump that delivers the fracturing fluid at different output flow rates that correspond to different driven speeds of the fracturing pump, a transmission and an auxiliary underdrive system. The auxiliary underdrive system includes a hydrostatic transmission that delivers power to the transmission through a different power flow path in an initial fracturing stage than during a normal fracturing stage. More particularly, the auxiliary underdrive system rotates an input shaft of the transmission at a slower rotational speed in the initial fracturing stage than an idle speed of the prime mover.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical embodiments of the present invention, will become more readily apparent by referring to the exemplary and, therefore, non-limiting, embodiments illustrated in the drawings accompanying and forming a part of this specification, wherein like reference numerals designate the same elements in the several views, and in which.

Figure 1:
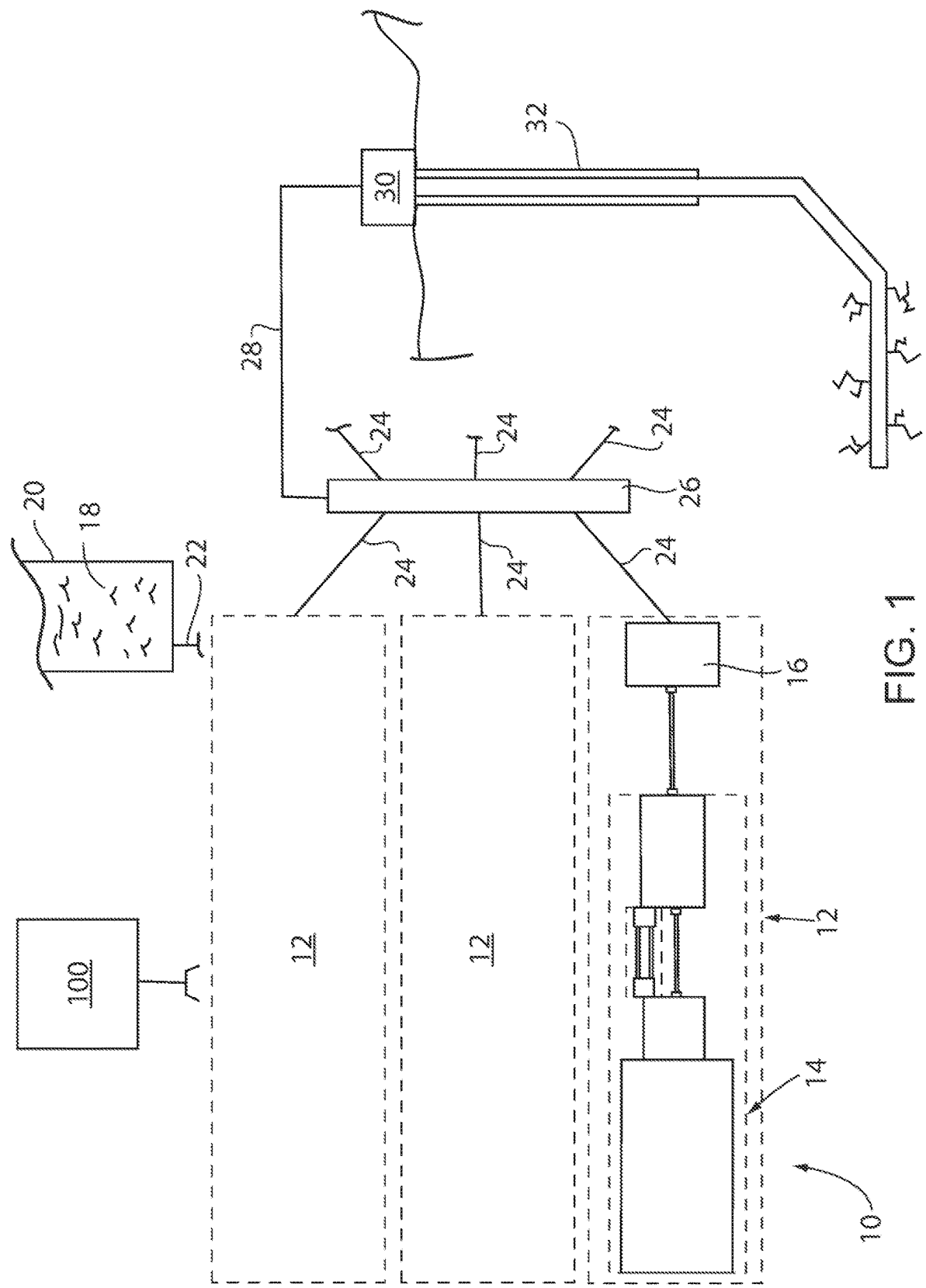
FIG. 1 is a schematic illustration of an oilfield pressure pumping system incorporating an auxiliary underdrive system, according to a preferred embodiment.

In describing preferred embodiments of the invention, which are illustrated in the drawings, specific terminology will be resorted to for the sake of clarity. However, it is not intended that the invention be limited to the specific terms so selected and it is to be understood that each specific term includes all technical equivalents, which operate in a similar manner to accomplish a similar purpose. For example, the words "connected", "attached", "coupled", or terms similar thereto are often used. They are not limited to direct connection but include connection through other elements where such connection is recognized as being equivalent by those skilled in the art.

DETAILED DESCRIPTION OF PREFERRED EMBODIMENTS

Referring to FIG. 1, one embodiment of the invention is shown as an oilfield pressure pumping system 10 that is configured to provide different operational modes to perform subterranean fracturing in different stages with different stimulus characteristics. The pumping system 10 is shown here implemented with a pressure pumper 12, which includes a power unit 14 that delivers power to a fracturing pump or frac pump 16. Frac pump 16 can be a positive displacement, high-pressure, plunger pump or other suitable pump that can deliver high flow rates and produce high pressures, for example, 10,000 psi (pounds per square inch) or more, typically at least 15,000 psi. Frac pump 16 is typically a multi-cylinder pump such as triplex (three cylinders) or quintuplex (five cylinders) pump.

Still referring to FIG. 1, this oilfield site is shown with multiple pressure pumpers 12 that operate together for subterranean geological formation fracturing or fracking operation to stimulate well production. The pressure pumpers 12 can be activated or brought online and implemented separately or together, depending on the particular pumping needs for a given fracking operation or operational stage. Each of the pressure pumpers 12 may define a singularly-packaged unit, for example, mounted on a trailer that can be towed by a semi-tractor or other tow vehicle. Each frac pump 16 receives fracturing fluid or frac fluid 18 that is stored in a frac fluid storage system 20 and delivers the frac fluid 18 to the frac pumps 16 through frac fluid delivery lines 22. Pressurized frac fluid 18 is delivered from the frac pumps 16, through manifold delivery lines 24, to manifold 26 that delivers the pressurized frac fluid 18 through manifold outlet line 28 to wellhead 30. At the wellhead 30, the frac fluid 18 is directed to flow through a borehole that extends through a well casing 32 for fracturing the subterranean formation.

Still referring to FIG. 1, a rate at which pressure pumper delivers the pressurized frac fluid 18 toward well head 30 varies as a function of a driven speed of frac pump 16. Different driven speeds of frac pump 16 are achieved by rotating the frac pump's 16 input shaft at different input rotational speeds, which provides different reciprocation speeds of pistons in the frac pump's 16 cylinders to pump the frac fluid 18 out of frac pump 16 at different delivery rates.

Figure 2:
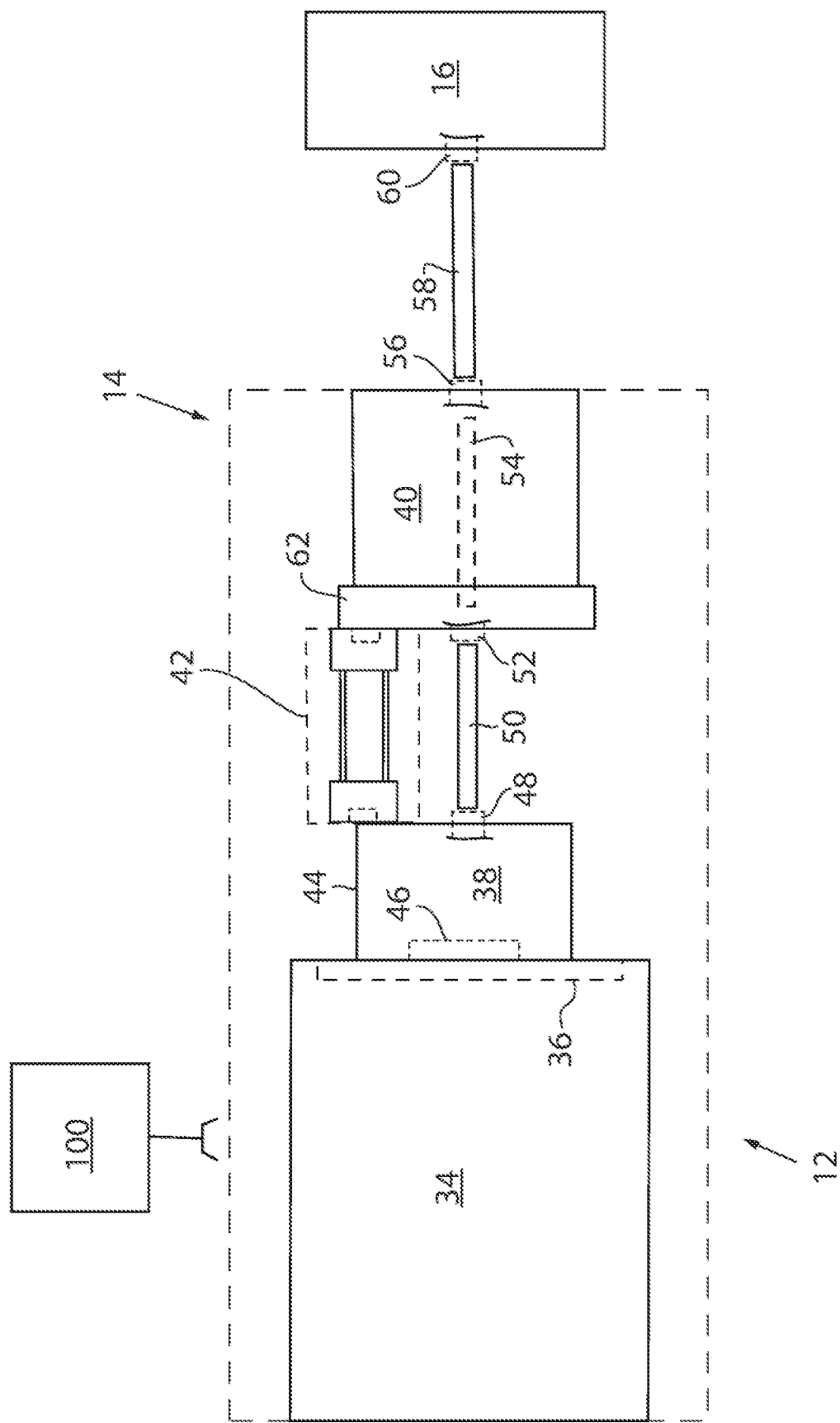
FIG. 2 is a schematic illustration of a pressure pumper of the oilfield pressure pumping system of FIG. 1, according to another preferred embodiment.

Referring now to FIG. 2, power unit 14 includes a prime mover which may be an internal combustion engine 34, which is typically a diesel internal combustion engine of at least 1,000 HP (horsepower) with an idle speed of about 800 rpm and a rated operational speed of about 1,600 to 1,800 rpm to provide its maximum torque output. Rotational energy from a flywheel 36, crankshaft-mounted pulley, or other output component of engine 34, is selectively and variably delivered by the rest the power unit 14 to frac pump 16. Power unit 14 further includes torque converter 38, transmission 40, and auxiliary underdrive system 42 that are controlled along with the operational speed of engine 34 to provide the desired delivery rate(s) of frac pump 16.

Still referring to FIG. 2, torque converter 38 may be a single-stage or multiple-stage hydraulic torque converter, which may also be configured to provide torque multiplication, such as ones available from Twin Disc®, Inc. for the energy industry. Torque converter 38 has a housing 44 that may be directly mounted to the engine 34, such as to an engine flywheel housing. Torque converter 38 surrounds internal components which may include vanes or other features such as turbines, stators, impellers, that cooperate to transmit torque through fluid mass in motion that provides a fluid coupling. Torque converter 38 is shown here with lockup clutch 46 at its input end, allowing the torque converter 38 to have unlocked and locked states. When the torque converter 38 is in the unlocked state, the lockup clutch is disengaged and the input and output ends of the torque converter 38 are fluidly coupled to each other. When the torque converter 38 is in the locked state, lockup clutch 46 is engaged and contacts/engages the engine's flywheel 36 and directly drives the torque converter's output shaft 48 to provide mechanical power transmission through the torque converter 38, instead of through the fluid coupling of the torque converter. This arrangement of components within power unit 14 allows different power flow paths through power unit 14, which may include selectively transmitting power through auxiliary underdrive system 42 and/or the upstream driveshaft 50 to transmission 40 in order to drive frac pump 16.

Still referring to FIG. 2, as shown here, transmission 40 may be mounted remote from torque converter 38, with driveshaft 50 connecting the torque converter's output shaft 48 to an input shaft 52 of transmission 40. The transmission input shaft 52 may be selectively coupled to a transmission main shaft 54 through a clutch(es) and/or gear-train components or the input shaft 52 may define the main shaft 54 of the transmission. Regardless, the main shaft 54 may be selectively coupled to a transmission output shaft 56 through a clutch(es) and/or gear-train components. Transmission 40 is typically a multi-speed, geared mechanical, transmission. Examples of transmissions 40 include industrial transmissions with multiple ranges, such as, for example, a model TA90-7600, available from Twin Disc®, Inc., that has small and consistent steps of ratios between ranges and is capable of changing ranges while the frac pump 16 is fully loaded. Transmission output shaft 56 is connected to and rotates driveshaft 58 that rotates input shaft 60 of frac pump 16. Transmission 40 is shown here with an integral pump tower or PTO tower section 62 that has at least one pump pad, shown here supporting component(s) of the auxiliary underdrive system 42. Transmission 40 or its tower section 62 may have other pump pads to support and drive other accessories. Other accessories may include two hydraulic pumps in a stacked double pump or other arrangement to provide pressurized hydraulic oil for lubrication and system pressure for hydraulic component actuation, and/or scavenge pump to remove or scavenge oil from, for example, a flywheel housing for wet flywheel application, or other housings that require oil scavenging.

Figure 3:
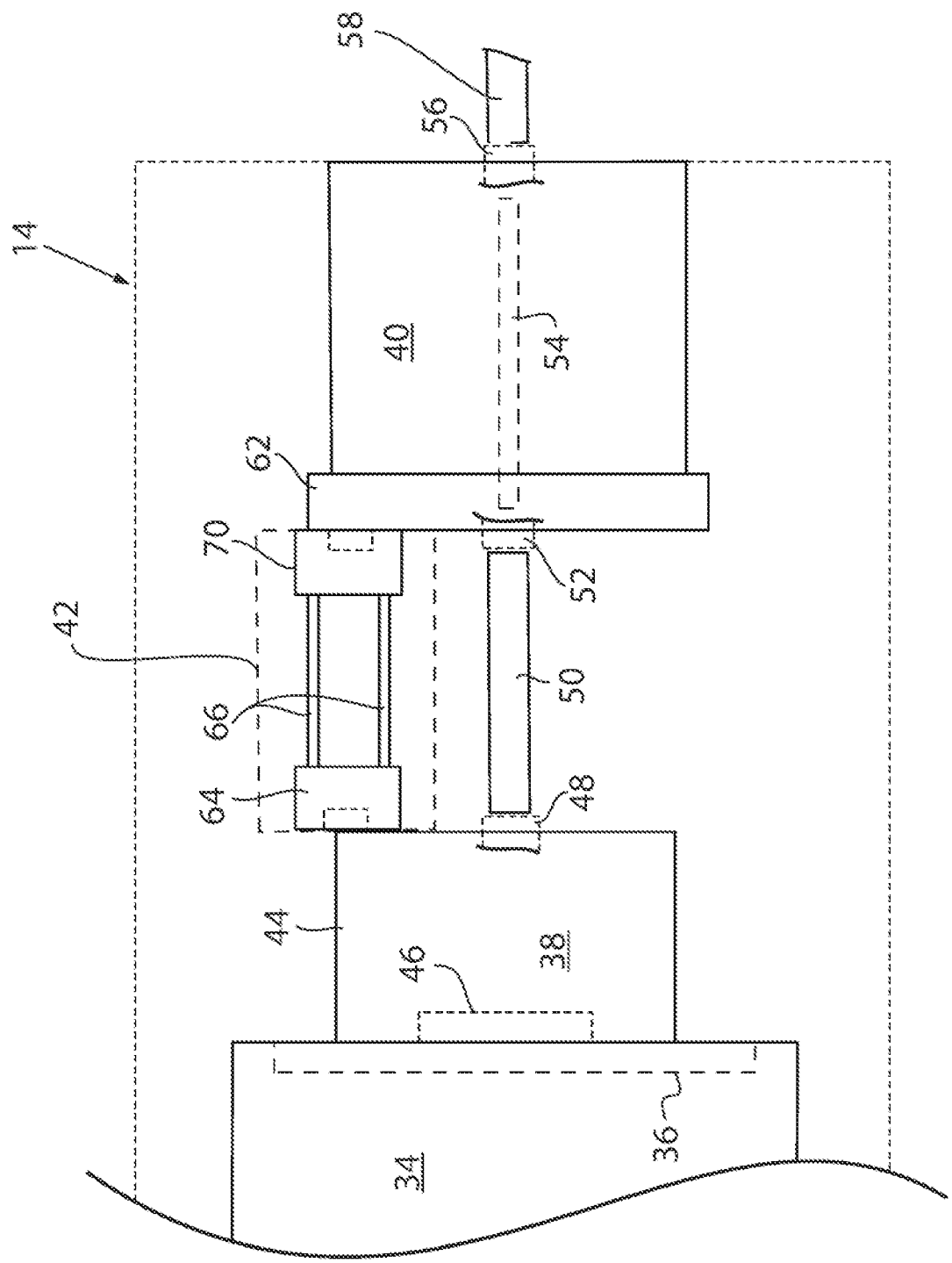
FIG. 3 is a schematic illustration of a power unit of the oilfield pressure pumping system of FIG. 1, according to another preferred embodiment.

Referring now to FIG. 3, auxiliary underdrive system 42 is configured to drive frac pump 16 (FIG. 1) to deliver high pressure frac fluid 18 (FIG. 1) at a slower delivery rate than can otherwise be achieved through engine 34 (FIG. 2), torque converter 38, and transmission 40 operating at their slowest operational speeds and/or lowest range(s). Auxiliary underdrive system 42 is shown here as a hydraulic underdrive system that provides a secondary hydrostatic transmission to provide power to transmission 40 in order to provide a driving force to frac pump 16 (FIG. 1) for high pressure low flow delivery of frac fluid 18 (FIG. 1).

Still referring to FIG. 3, auxiliary underdrive system 42 includes pump 64 that may by a hydraulic pump mounted to a pump pad of the torque converter 38 case or housing. Pump 64 may be driven directly by engine 34 by, for example, its driven connection to internal components of torque converter 38 that are driven in unison with the engine flywheel 36, such as an input shaft or rotor housing, regardless of the operational state of torque converter. Hydraulic lines 66 hydraulically connect pump 64 to motor 70 that may by a hydraulic motor mounted to a pump pad of the transmission's pump or PTO tower section 62. Motor 70 selectively provides power to transmission 40, for example, by rotating an output shaft of motor 70 to rotate a gear within the pump pad that correspondingly drives the transmission's input shaft 52 or main shaft 54. Controlling pump 64 and motor 70 allows for selectively delivering power to transmission 40 and driving transmission output shaft 56 as an underdrive power path when power is not being transmitted through a normal or default power path from torque converter 44 to transmission 40 through driveshaft 50.

Figure 4:
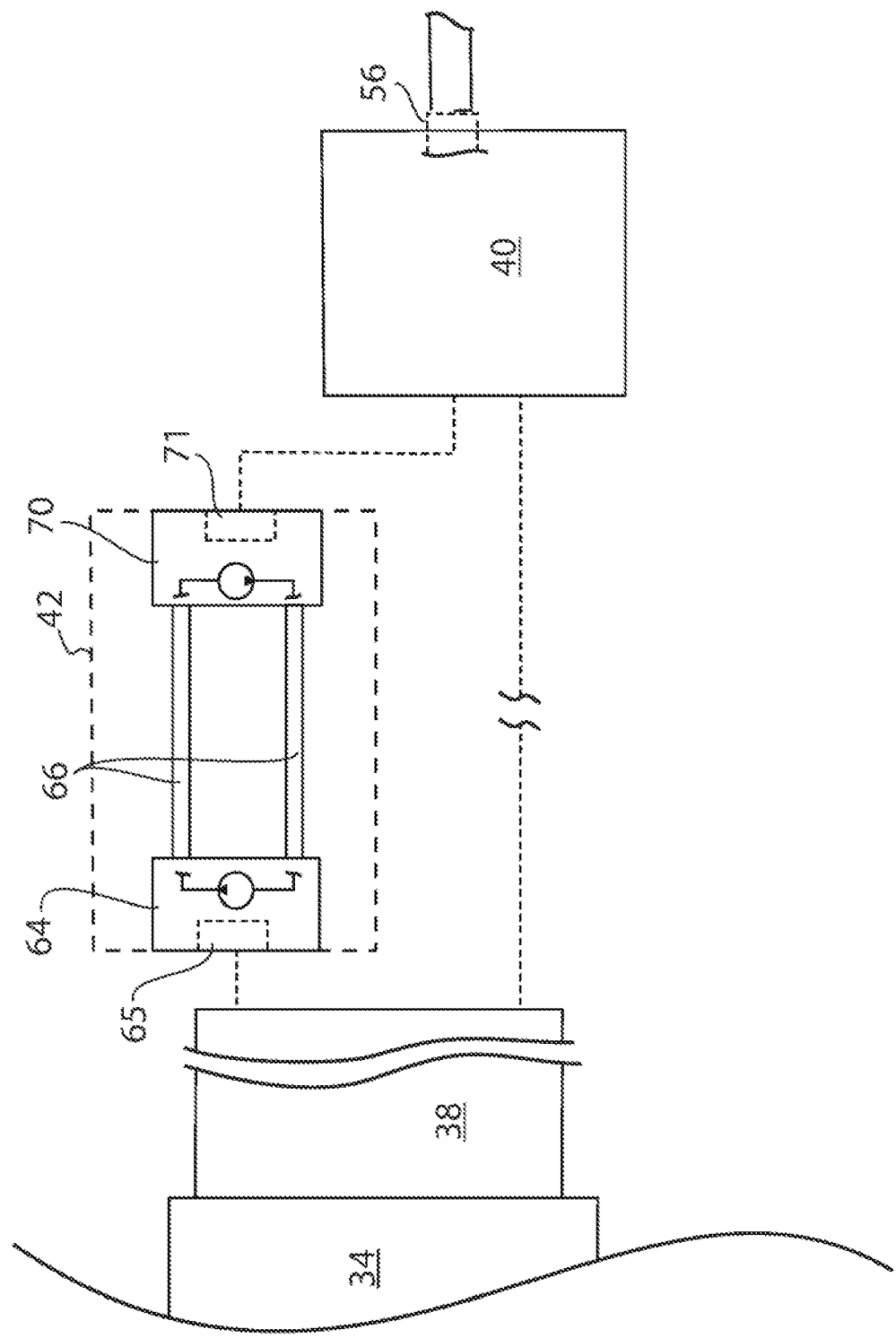
FIG. 4 is a schematic illustration of portions of the power unit of the oilfield pressure pumping system of FIG. 1 with a first pump(s) configuration of the auxiliary underdrive system, according to another preferred embodiment.
Figure 5:
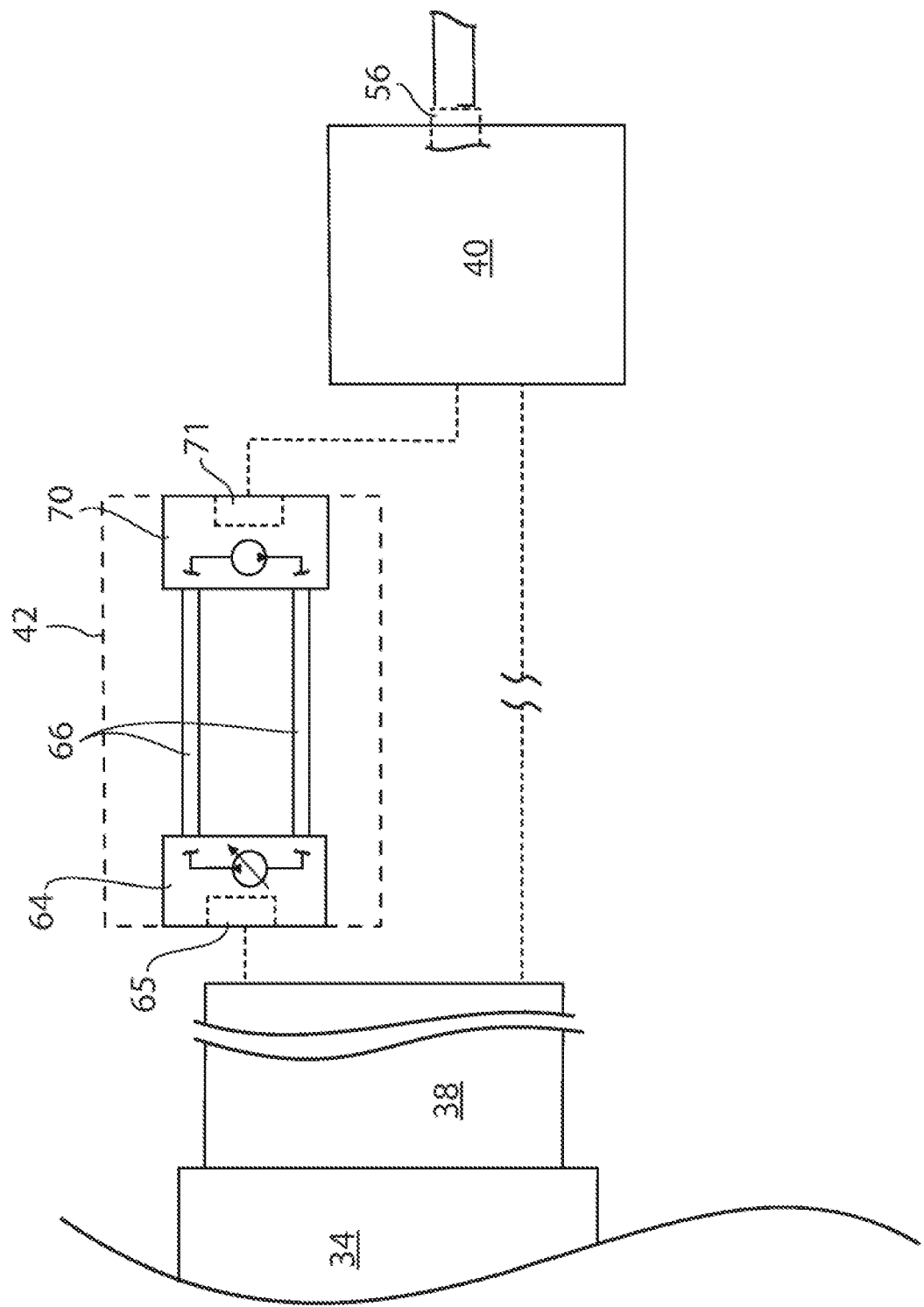
FIG. 5 is a schematic illustration of portions of the power unit of the oilfield pressure pumping system of FIG. 1 with another pump(s) configuration of the auxiliary underdrive system, according to another preferred embodiment.
Figure 6:
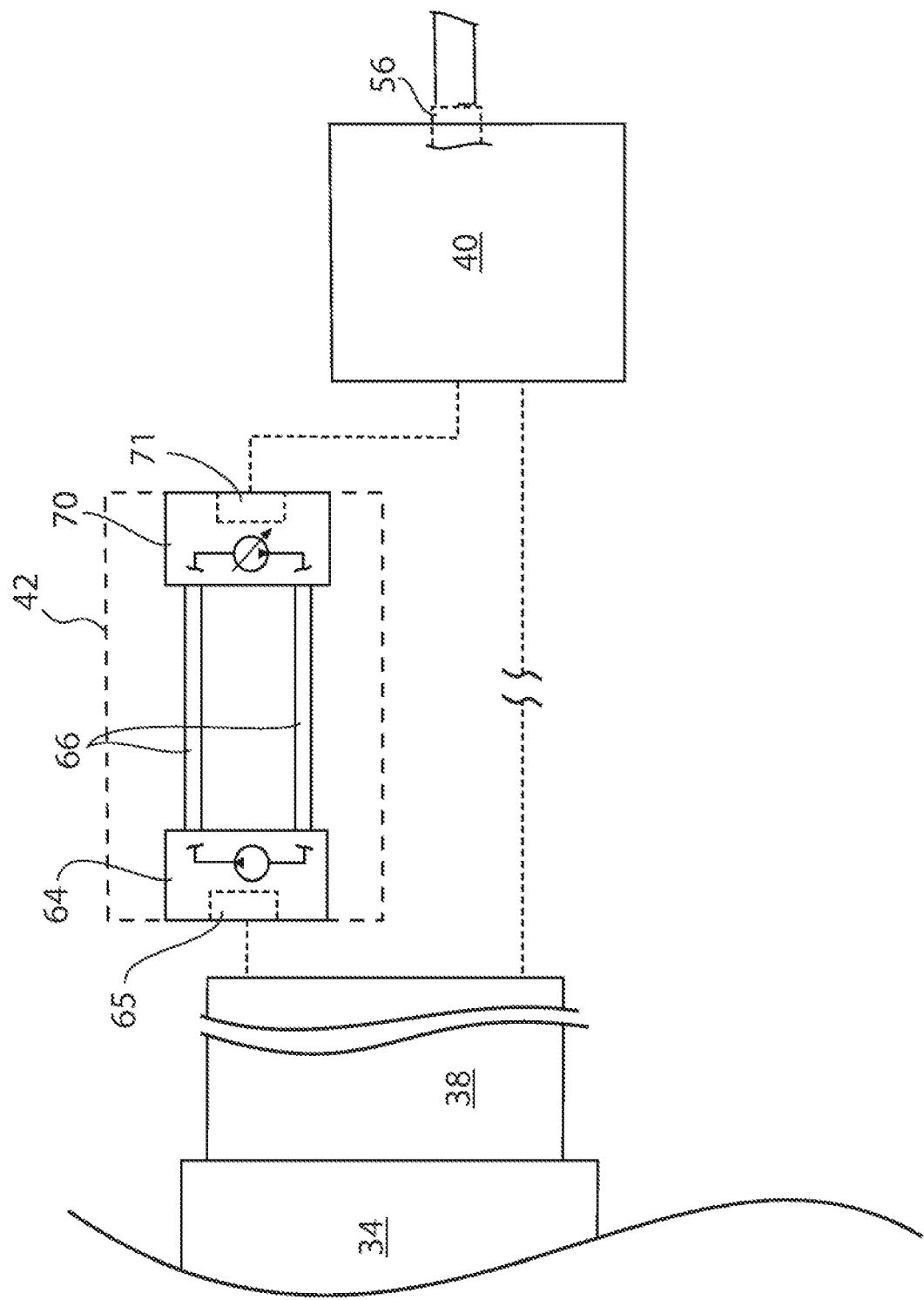
FIG. 6 is a schematic illustration of portions of the power unit of the oilfield pressure pumping system of FIG. 1 with a further pump(s) configuration of the auxiliary underdrive system, according to another preferred embodiment.

Referring now to FIGS. 4-6, these figures show various configurations of pump 64 and motor 70 within auxiliary underdrive system 42. FIG. 4 shows pump 64 as a fixed displacement pump and motor 70 as a fixed displacement motor. In this arrangement, changing operating speed of engine 34 is used to change rotational speed of motor 70 and correspondingly the rotational speed of transmission output shaft 56 and the frac fluid delivery rate of frac pump 16 (FIG. 2). FIG. 5 shows pump 64 as a variable displacement pump and motor 70 as a fixed displacement motor. In this arrangement, changing rotational speed of motor 70 to change the rotational speed of transmission output shaft 56 and the frac fluid delivery rate of frac pump 16 (FIG. 2) can be accomplished by changing the output flow rate of pump 64, independent of the operating speed of engine 34 (FIG.

3). FIG. 6 shows pump 64 as a fixed displacement pump and motor 70 as a variable displacement motor. In this arrangement, changing rotational speed of motor 70 to change the rotational speed of transmission output shaft 56 and the frac fluid delivery rate of frac pump 16 (FIG. 2) can be accomplished by changing the input flow rate of motor 70, independent of the operating speed of engine 34 (FIG. 3). Variable displacement versions of pump 64 and motor 70 can be swash plate-type pumps or motors with variable swash plate angles to provide the variable displacement. Clutches such as clutches 65 and 71 may be incorporated between each pump 64 and motor 70 and the respective component it is driven by or that it drives to selectively disengage power flow through the hydrostatic transmission of auxiliary underdrive system 42.

Referring again to FIG. 2, control system 100 controls the operational characteristics of power unit 14 and its subsystems and components. Examples include operational speed of engine 34, engaging and disengaging lockup clutch 46 of torque converter 38, internal clutches of transmission 40 to selectively deliver power through the transmission and/or select range(s) of transmission 40, engaging and disengaging clutches 65 (FIGS. 4) and 71 (FIG. 4) within auxiliary underdrive system 42, and controlling the displacement of variable displacement pumps 64 (FIG. 4) and/or motors 70 (FIG. 4). Control system 100 includes a computer that executes various stored programs while receiving inputs from and sending commands to the pressure pumper 12 (FIG. 1) for controlling, for example, energizing and de-energizing various system components as well as bringing the pumping system 10 online in different stages for staged fracking the subterranean formations by controlling the various electronic, electromechanical, and hydraulic systems and/or other components of each pressure pumper 12. Control system 100 may include the TDEC-501 electronic control system available from Twin Disc®, Inc. for controlling the pressure pumper(s) 12. A closed loop controller (proportional, integral, derivative (PID)) controller may be implemented in hardware or software of control system 100 to facilitate control methodologies of the auxiliary underdrive system 42 to approach and/or maintain a target frac fluid delivery rate, which may relate to a monitored and controlled speed of a rotating component within the pressure pumper 12. This may include controlling the hydrostatic transmission of auxiliary underdrive system 42 to vary the driving speed and output flow rate of frac pump 16 (FIG. 2). Controlling the hydrostatic transmission of auxiliary underdrive system 42 and other components of pressure pumper 12 by way of control system 100 allow pumping system 10 (FIG. 10) to operate in different modes to, for example, provide different types of stimulus to the subterranean formation and different fracturing stages.

Figure 7:
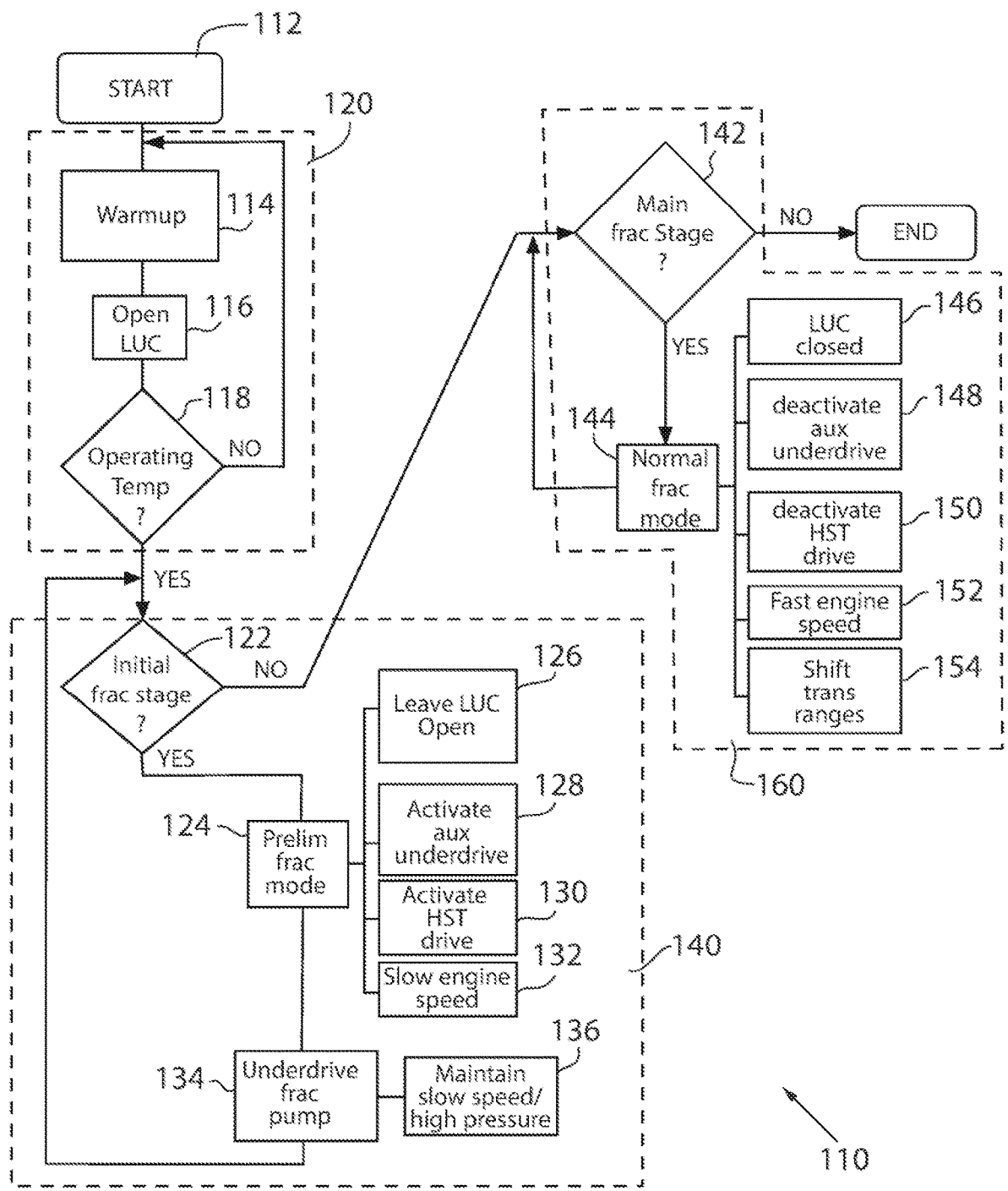
FIG. 7 is a flow chart illustrating a method of operating an oilfield pressure pumping system in different operational modes to selectively underdrive a transmission during at least some of the operational modes according to the preferred embodiments.

Referring now to FIG. 7 and with background reference to FIGS. 1 and 3 showing various subsystems and components, an example of a use methodology is shown as process 110, which starts at block 112 and begins an engine warmup procedure at block 114. At block 116, the lockup clutch 46 is opened or disengaged. Control system 100 evaluates engine temperature, such coolant temperature, to determine if the engine obtained the desired operating temperature at block 118. Blocks 114, 116, and 118 may at least partially define a warmup stage of pressure pumper 12 (FIG. 1), represented by the dashed box 120 that allows engine 34 to warm up under light load.

Still referring to FIG. 7, as represented at block 122, if an initial frac stage is implemented, then control system 100 initiates a preliminary frac mode of pumping system 10, as represented at block 124. When in the preliminary frac mode, lockup clutch 46 is left open or disengaged at block 126 and auxiliary underdrive system 42 is activated, as represented at block 128. When auxiliary underdrive system 42 is activated, for versions that implement a hydrostatic transmission, control system 100 engages and/or disengages various clutches within the pressure pumper 12 so pump 64 is driven by engine 34. This may include directly driving pump 64 by the engine 34 itself, or directly or otherwise driving it by way of a torque converter 38, depending on the particular mounting location and configuration of pump 64. As represented at block 130, the hydrostatic transmission of auxiliary underdrive system 42 delivers power to the geared transmission 40 by using pump 64 to hydraulically drive motor 70, which delivers a driving torque to transmission 40. As represented at block 132, engine 34 may be operated at a slow speed, for example, at idle or near idle, such as within about 10% of idle speed, plus or minus 5%. Transmission 40, driven by auxiliary underdrive system 42, rotates driveshaft 58 to drive frac pump 16 at an underdrive speed. The underdrive speed is slower than what engine 34, torque converter 38 and transmission 40 can drive the frac pump 16 at when at their slowest speeds and in their lowest ranges, as represented at block 134. As represented at block 136, the motor's torque and speed is controlled by control system 100 to maintain the desired slow speed and high pressure output of frac pump 16. This may be done with an electro hydraulic valve that provides proportional control and uses a desired speed signal as a reference in a closed loop controller (e.g., PID). In this way, pump 64 and/or motor 70 can be controlled to provide hydraulic power speed advance or retardation to increase or decrease the driving speed of frac pump 16 to attenuate differences between observed speed and desired speed. A target or desired speed may be or correspond to a driving rotational speed of frac pump 16 of about 30 rpm or less, for example, 27 rpm or 25 rpm or another state that corresponds to a desired flow rate of the frac pump 16 while maintaining sufficiently high pressure to fracture the subterranean formation. This pressure is maybe at least 10,000 psi or at least about 15,000 psi. If pumping system 10 is still in the initial fracturing stage, then blocks 122, 124, 126, 128, 130, 132, 134, and 136 repeat, which may at least partially define a slow speed/high pressure preliminary fracturing stage, represented by the dashed box 140. During the slow speed/high pressure preliminary fracturing stage, a preliminary fracking power path may be defined by a power path from engine 34, through the open or disengaged/unlocked torque converter 34, through auxiliary underdrive system 42, through transmission 40, and into frac pump 16 to drive it to provide high pressure delivery of frac fluid 18 at the underdrive or underdriven speed.

Still referring to FIG. 7, after the slow speed/high pressure preliminary fracturing stage 140, control system 100 may command pumping system 10 to enter a main frocking stage at block 142. Control system 100 may initiate a normal fracking mode of pumping system 10 during the main fracking stage, as represented at block 144. A decision to exit the slow speed/high pressure preliminary fracturing stage 140 and enter the normal frac mode can be made by control system 100 by way of timers and/or monitoring system characteristics. One example is that control system 100 can monitor the pressure of frac pump 16 and use pressure drop of a predetermined magnitude as an indicator of sufficient subterranean fracturing to proceed to the normal frac mode. When in the normal frac mode, clutches 65 and/or 71 of auxiliary underdrive system 42 may be disengaged and lockup clutch 46 may be closed or engaged at block 146 to mechanically transmit torque through torque converter 38 without relying on its fluid coupling or hydrostatic drive from auxiliary underdrive system 42. At this point, auxiliary underdrive system 42 including its hydrostatic transmission is deactivated, as represented at blocks 148, 150. This provides torque transmission through a different power path than when auxiliary underdrive system 42 drives transmission 40 and frac pump 16. When in the normal frac mode, a normal fracking power path is defined from engine 34, through the locked torque converter 38 with its lockup clutch 46 engaged, through transmission 40, and into frac pump 16. As represented at blocks 152 and 154, engine 34 may be operated a higher speed, for example, its rated operational speed to provide maximum torque and the transmission 40 may be shifted between ranges to drive frac pump 16 to provide the desired fracturing characteristics. If pumping system 10 is still in the normal fracturing stage, then blocks 142, 144, 146, 148, 150, 152, and 154 may repeat, which may at least partially define a high speed/high pressure normal fracturing stage, represented by the dashed box 160.

Although the best mode contemplated by the inventors of carrying out the present invention is disclosed above, practice of the above invention is not limited thereto. It will be manifest that various additions, modifications, and rearrangements of the features of the present invention may be made without deviating from the spirit and the scope of the underlying inventive concept.

What is claimed is:

1. An oilfield pressure pumping system for delivering a fracturing fluid into a subterranean formation, the oilfield pressure pumping system comprising:
   a pressure pumper configured to deliver the fracturing fluid into the subterranean formation to fracture the subterranean formation, the pressure pumper including:
      a fracturing pump that delivers the fracturing fluid at different output flow rates that correspond to different driven speeds of the fracturing pump;
      a power unit that drives the fracturing pump at the different driven speeds and includes:
         a prime mover;
         a transmission that receives power from the prime mover and selectively delivers power to drive the fracturing pump;
         a torque converter arranged between the prime mover and the transmission, the torque converter defining a main output configured to deliver power to the transmission and an auxiliary output; and
      an auxiliary underdrive system that is configured to receive power from the torque converter auxiliary output and selectively deliver power to the transmission for driving the fracturing pump.

2. The oilfield pressure pumping system of claim 1, wherein:
   the prime mover is an internal combustion engine; and
   the pressure pumper defines:
      a normal fracking mode with the internal combustion engine delivering power to the transmission for driving the fracturing pump; and
      a preliminary fracking mode with the auxiliary underdrive system delivering power to the transmission for driving the fracturing pump.

3. The oilfield pressure pumping system of claim 2, wherein:
   the transmission includes a transmission input shaft;
   the internal combustion engine defines an engine idle speed; and
   the auxiliary underdrive system rotates the transmission input shaft at a slower rotational speed than the engine idle speed.

4. The oilfield pressure pumping system of claim 2, wherein the torque converter auxiliary output comprises:
   a pump pad that connects the auxiliary underdrive system to the torque converter.

5. The oilfield pressure pumping system of claim 4, wherein the auxiliary underdrive system receives power from the torque converter and delivers power to the transmission.

6. The oilfield pressure pumping system of claim 5, the auxiliary underdrive system comprising:
   a hydraulic pump that receives power from the torque converter; and
   a hydraulic motor driven by the hydraulic pump and delivering power to the transmission when the pressure pumper is in the preliminary fracking mode.

7. The oilfield pressure pumping system of claim 6, wherein:
   the hydraulic pump is mounted to a pump pad of the torque converter; and
   the hydraulic motor is mounted to a pump pad of the transmission.

8. The oilfield pressure pumping system of claim 1, wherein:
   the power unit torque converter includes a lockup clutch arranged between the internal combustion engine and the transmission, the torque converter defining:
      a locked state in which the lockup clutch is engaged; and
      an unlocked state in which the lockup clutch is disengaged;
   the auxiliary underdrive system including:
      a hydraulic pump that receives power from the torque converter; and
      a hydraulic motor driven by the hydraulic pump and delivering power to the transmission; and wherein:
   the power unit defines:
      a normal fracking mode in which:
         the torque converter is in the locked state;
         a normal fracking power path is defined by a first power path from the internal combustion engine, through the locked torque converter, through the transmission, and into the fracturing pump to drive the fracturing pump at a first, relatively faster, speed to deliver the fracturing fluid at a first, relatively greater, output flow rate; and
      a preliminary fracking mode in which:
         the torque converter is in the unlocked state;
         a preliminary fracking power path is defined by a second power path from the internal combustion engine, through the unlocked torque converter, through the auxiliary underdrive system, through the transmission, and into the fracturing pump to drive the fracturing pump at a second, relatively slower, speed to deliver the fracturing fluid at a second, relatively lesser, output flow rate.

9. The oilfield pressure pumping system of claim 1, wherein:
   the transmission is a geared mechanical transmission; and
   the auxiliary underdrive system includes a hydrostatic transmission.

10. An oilfield pressure pumping system for delivering a fracturing fluid into a subterranean formation, the oilfield pressure pumping system comprising:
a pressure pumper configured to deliver the fracturing fluid into the subterranean formation to fracture the subterranean formation, the pressure pumper including:
a fracturing pump that delivers the fracturing fluid at different output flow rates that correspond to different driven speeds of the fracturing pump;
a power unit that drives the fracturing pump at the different driven speeds and includes:
a prime mover;
a transmission that receives power from the prime mover and selectively delivers power to drive the fracturing pump; and
an auxiliary underdrive system that selectively delivers power to the transmission for driving the fracturing pump;
wherein:
the prime mover is defined by an internal combustion engine that operates at variable speeds and includes an idle speed as a slowest engine speed;
the transmission has multiple ranges that correspond to multiple gear ratios for driving the fracturing pump at different rotational speeds at a constant speed of the internal combustion engine, with the multiple ranges including a low range as a lowest gear ratio;
the pressure pumper power unit defines a slowest engine-driven speed defined when:
the internal combustion engine is operating at the idle speed; and
the transmission is in the low range; and
the auxiliary underdrive system selectively drives the fracturing pump at an underdrive speed that is slower than the slowest engine-driven speed.

11. An oilfield pressure pumping system for delivering a fracturing fluid into a subterranean formation, the oilfield pressure pumping system comprising:
a pressure pumper configured to deliver the fracturing fluid into the subterranean formation to fracture the subterranean formation, the pressure pumper including:
a fracturing pump that delivers the fracturing fluid at different output flow rates that correspond to different driven speeds of the fracturing pump;
a power unit that drives the fracturing pump at the different driven speeds and includes:
a prime mover;
a transmission that receives power from the prime mover and selectively delivers power to drive the fracturing pump; and
an auxiliary underdrive system that selectively delivers power to the transmission for driving the fracturing pump;
wherein:
the transmission is a geared mechanical transmission; and
the auxiliary underdrive system includes a hydrostatic transmission;
a torque converter arranged between the internal combustion engine and the geared mechanical transmission, the torque converter selectively delivering power to the geared mechanical transmission through either of:
a first power flow path that extends through the hydrostatic transmission of the auxiliary underdrive system; and
a second power flow path that does not extend through the hydrostatic transmission of the auxiliary underdrive system.

12. The oilfield pressure pumping system of claim 11, wherein the pressure pumper defines:
a normal fracking mode with the torque converter delivering power directly to the geared mechanical transmission; and
a preliminary fracking mode with the torque converter delivering power to the hydrostatic transmission of the auxiliary underdrive system and the hydrostatic transmission of the auxiliary underdrive system delivering power to the geared mechanical transmission.

13. An oilfield pressure pumping system for delivering a fracturing fluid into a subterranean formation at a slow speed and high pressure using a prime mover, the oilfield pressure pumping system comprising:
a pressure pumper configured to deliver the fracturing fluid into the subterranean formation to fracture the subterranean formation, the pressure pumper including a fracturing pump that delivers the fracturing fluid at different output flow rates that correspond to different driven speeds of the fracturing pump, a transmission, a torque converter, and an auxiliary underdrive system that includes a hydrostatic transmission that is arranged between the torque converter and the transmission and delivers power to the transmission through a first power flow path in an initial fracturing stage and through a second power flow path during a normal fracturing stage; and
wherein the auxiliary underdrive system rotates an input shaft of the transmission at a slower rotational speed in the initial fracturing stage than an idle speed of the prime mover.

14. The oilfield pressure pumping system of claim 13, wherein:
the transmission is a geared mechanical transmission.

15. An oilfield pressure pumping system for delivering a fracturing fluid into a subterranean formation at a slow speed and high pressure using a prime mover, the oilfield pressure pumping system comprising:
a pressure pumper configured to deliver the fracturing fluid into the subterranean formation to fracture the subterranean formation, the pressure pumper including a fracturing pump that delivers the fracturing fluid at different output flow rates that correspond to different driven speeds of the fracturing pump, a transmission and an auxiliary underdrive system that includes a hydrostatic transmission that delivers power to the transmission through a first power flow path in an initial fracturing stage and through a second power flow path during a normal fracturing stage; and
wherein:
the auxiliary underdrive system rotates an input shaft of the transmission at a slower rotational speed in the initial fracturing stage than an idle speed of the prime mover;
the transmission is a geared mechanical transmission; and
the pressure pumper further comprises:
a torque converter arranged between the internal combustion engine and the transmission, the torque converter selectively delivering power to each of:
the geared mechanical transmission; and the hydrostatic transmission of the auxiliary underdrive system.

\* \* \* \* \*